United States Patent
Meyer et al.

(10) Patent No.: US 11,703,063 B2
(45) Date of Patent: Jul. 18, 2023

(54) PUMP GLAND WITH ROTARY DYNAMIC SEAL

(71) Applicant: Viking Pump, Inc., Cedar Falls, IA (US)

(72) Inventors: Scott Meyer, Brandon, IA (US); Andrew Anderson, Waterloo, IA (US); Brian Atwood, Cedar Falls, IA (US); Joe Papp, Cedar Falls, IA (US)

(73) Assignee: Viking Pump, Inc., Cedar Falls, IA (US)

( * ) Notice: Subject to any disclaimer, the term of this patent is extended or adjusted under 35 U.S.C. 154(b) by 0 days.

(21) Appl. No.: 17/455,230

(22) Filed: Nov. 17, 2021

(65) Prior Publication Data
US 2022/0163045 A1 May 26, 2022

Related U.S. Application Data

(60) Provisional application No. 63/118,153, filed on Nov. 25, 2020.

(51) Int. Cl.
*F04D 29/12* (2006.01)
*F04D 29/10* (2006.01)

(52) U.S. Cl.
CPC ......... *F04D 29/126* (2013.01); *F04D 29/106* (2013.01)

(58) Field of Classification Search
CPC ..... F04D 29/126; F04D 29/106; F16J 15/002; F16J 15/004; F16J 15/006
See application file for complete search history.

(56) References Cited

U.S. PATENT DOCUMENTS

| 4,560,173 A | 12/1985 | Adams et al. | |
|---|---|---|---|
| 5,137,116 A * | 8/1992 | Von Bergen | B63H 23/321 184/104.1 |
| 5,219,434 A * | 6/1993 | Von Bergen | F16J 15/3456 210/171 |
| 5,643,026 A * | 7/1997 | Pietsch | F16J 15/004 277/927 |

(Continued)

FOREIGN PATENT DOCUMENTS

| CN | 206889325 U | 1/2018 |
|---|---|---|
| GB | 596538 A | 1/1948 |
| WO | 2017202592 A1 | 11/2017 |

*Primary Examiner* — Gilbert Y Lee
(74) *Attorney, Agent, or Firm* — Tucker Ellis LLP; Heather M. Barnes; Michael G. Craig

(57) ABSTRACT

One or more techniques and/or systems are disclosed for mitigating fluid loss or leakage from a fluid pump with a rotating shaft driving a pumping mechanism. A seal gland component can have two or more internal seals formed by two or more seal components, such as O-rings, that create one or more chambers that act as a lubricant/barrier fluid reservoir to provide for reduced friction and mitigate release of gaseous emissions. Further, the seal gland component can be a retrofit on an existing shaft to provide for greater life and efficiency as compared to the existing packing gland or other sealing components. Further, the one or more internal seals can be arranged within the seal gland in an asymmetrical manner such that the seal gland can be removed from a shaft, rotated, and reinstalled with the internal seals contacting a different position on the surface of the shaft.

20 Claims, 14 Drawing Sheets

(56) References Cited

U.S. PATENT DOCUMENTS

| | | | | |
|---|---|---|---|---|
| 6,227,547 B1 * | 5/2001 | Dietle | ................ | F16J 15/006 |
| | | | | 277/401 |
| 6,481,720 B1 * | 11/2002 | Yoshida | ............ | F16J 15/002 |
| | | | | 277/927 |
| 6,834,574 B2 | 12/2004 | Neumann | | |
| 7,201,379 B2 * | 4/2007 | Lemetteil | ............ | F16J 15/445 |
| | | | | 277/411 |
| 7,552,671 B2 | 6/2009 | Neumann | | |
| 8,348,281 B2 * | 1/2013 | Yoshida | ............ | F16J 15/322 |
| | | | | 277/560 |
| 8,505,924 B2 | 8/2013 | Dietle et al. | | |
| 8,608,176 B2 * | 12/2013 | Bachhofner | ......... | F16J 15/406 |
| | | | | 277/562 |
| 9,404,582 B2 * | 8/2016 | Wrage | ............ | B63H 23/321 |
| 2002/0197151 A1 | 12/2002 | Rockwood | | |
| 2018/0100583 A1 | 4/2018 | Iehl et al. | | |
| 2019/0145521 A1 | 5/2019 | Vainikainen | | |

\* cited by examiner

PUMP GLAND WITH ROTARY DYNAMIC SEAL

CROSS-REFERENCE TO RELATED APPLICATIONS

This application claims priority to U.S. Provisional Patent Application Ser. No. 63/118,153, entitled PUMP GLAND WITH ROTARY DYNAMIC SEAL, filed Nov. 25, 2020, which is incorporated herein by reference.

BACKGROUND

Fluid pumps are often used in harsh environments such as high temperatures, continuous duty cycling applications, thermal cycling applications, and in environments having the presence of abrasives, and/or under vacuum. Traditional mechanical seals often fail due to these conditions. Specialized seals such as mechanical seals that utilize a seal support or lip seals are sometimes used, each having their drawbacks as well. Certain fluid pumps used in such settings often utilize a packing seal system, which can comprise packing material and a packing gland, to mitigate loss of the transported or pumped fluid from the fluid transport system, and/or to mitigate intrusion of contaminants. These sealing systems are typically implemented along a rotating shaft that is used to drive the pumping component. For example, packing material can be compressed against a back seat, on a rotating shaft, by the packing gland and follower components. These types of packing seal systems are intentionally designed to leak process (pumped) fluid, and require skilled operators to install and adjust. However, the leaking of the process fluid can result in undesired conditions such as exposure to chemicals, environmental contamination, and economic loss from fluid waste; and improper installation can lead to operational issues, and intrusion of unwanted contaminants.

SUMMARY

This summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems described herein can be utilized to help mitigate fluid loss or leakage from a fluid pump with a rotating shaft driving a pumping mechanism, such as in a gear pump, for example. In one implementation, a seal gland can comprise a body having a first end, a second end, and a midpoint therebetween. The body can comprise a tube portion, and one or more circumferential channels disposed along an inside of the tube portion. In some implementations, the one or more channels can be arranged along the inside of the tube portion asymmetrically with respect to the midpoint of the body. One or more sealing elements may be disposed within the one or more channels, and can define a lubrication channel therebetween. The seal gland can be configured to be reversible such that the seal gland can be installed on a shaft of a pump and be coupled to the pump at either the first end or the second end. In these implementations, the asymmetrical arrangement of the channels and corresponding sealing elements may allow the sealing elements to contact different locations of the surface of the pump shaft while the seal gland is in its alternate installations. Further, the seal gland may be modular, for example, allowing a plurality of seal glands to be operably stacked together along the shaft.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
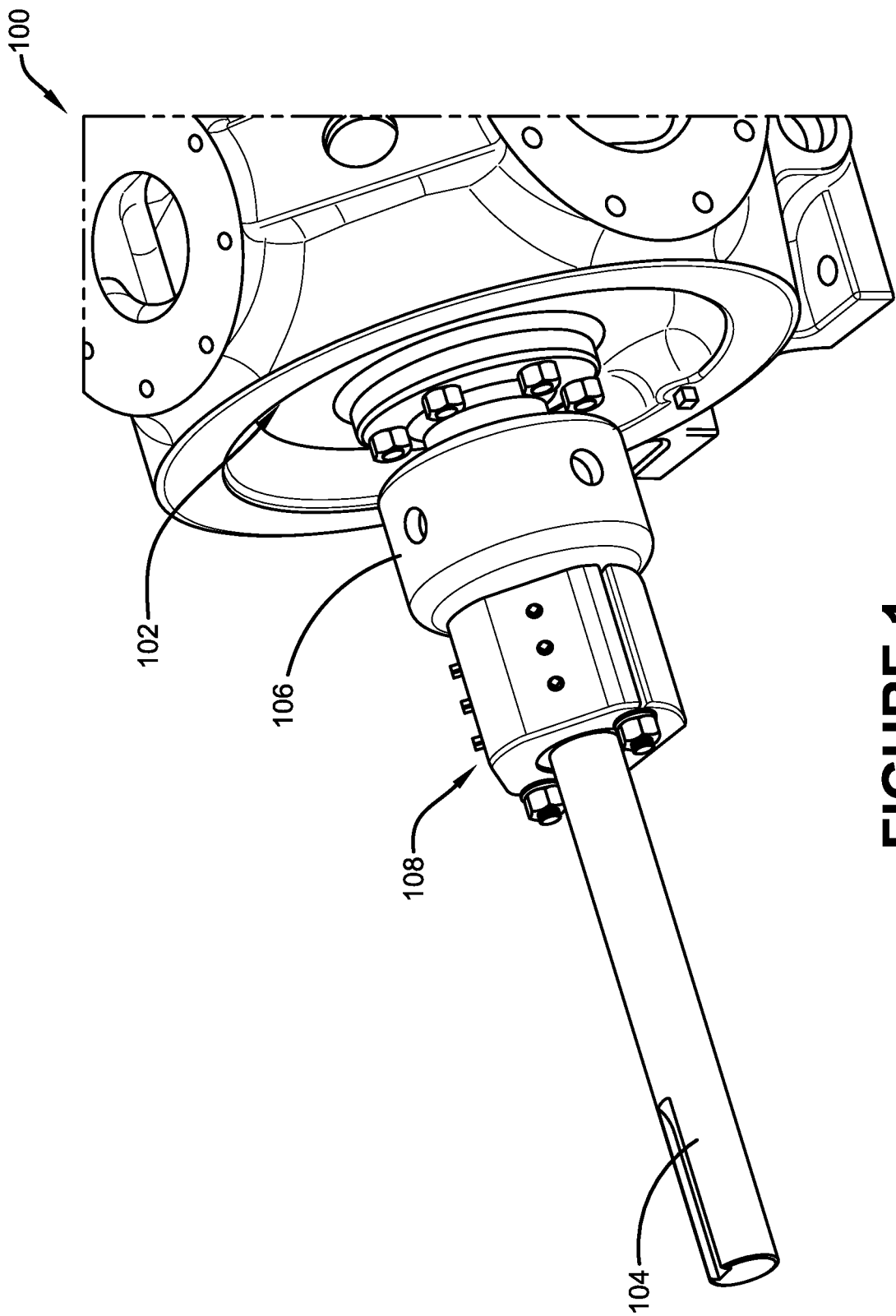
FIG. 1 is a component diagram illustrating an example pump where one or more portions of the innovative system, described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As an example, pumps can be coupled to a motor, engine, or other power supply by a shaft that transfers rotation power from the motor to the pump. The motor typically rotates the shaft, which, in turn, rotates a pump rotor in a pumping chamber of the pump to move fluids through conduits coupled to the pump chamber. However, the location at which the rotating pump shaft enters the pumping chamber, comprising the pump rotor, provides a location where leakage of the pumped fluid from the pump chamber may occur. In one aspect, a system may be devised for dynamically sealing a rotating pump shaft entrance to the pumping chamber to mitigate leakage of pumped fluid along the rotating pump shaft.

In one implementation, an innovative pump shaft seal gland can be used, to hold one or more seals (e.g., gaskets, O-rings, lip seals) between the seal gland and a rotating shaft. In this implementation, the seal gland can be configured to hold one or more dynamic seal elements (seals), such as O-rings, lip seals, or other elastomeric components, that form a seal on the rotating shaft of the pump. That is, for example, the seal elements are dynamic because they create a seal to mitigate fluid leakage between the seal gland and a moving object (e.g., the rotating shaft). Further, one or more channels or grooves can be formed on an interior of the seal gland. The seal element may be configured to be disposed within the channels or grooves, which may be spaced apart to form one or more chambers therebetween that can act as a lubricant/fluid reservoir. Each lubricant reservoir may have a port to form a connection between the chamber and port fitting locations on the external portion of the seal gland. The disclosed system can incorporate features that allow the seal gland to be retrofittable to existing pumps, to have multi-seal redundancy, to be reversible, and to allow for ease of use and maintenance, all while providing improved leak mitigation abilities.

FIG. 1 is a component diagram illustrating an example pump apparatus 100, where one or more portions of the innovative system, described herein may be implemented. In some implementation, the pump apparatus 100 can include a motor (not shown) that can drive the rotation of a shaft 104. The shaft 104 can be coupled to the motor portion (e.g., using a keyed shaft coupler), and may also be supported by various components such as a rotor bearing sleeve (RBS) 106. In this example, the shaft 104 enters into the pump housing 102 at the RBS 106, to rotate one or more pumping elements (not shown), such as vanes, gears, etc. Also depicted is an exemplary seal gland 108, which can be coupled to the pump 100, for example, by mounting to the shaft 104 at the RBS 106. For example, the seal gland 108 can be installed by inserting the pump shaft 104 through the inner bore of the seal gland 108 and then sliding the seal gland 108 down the shaft 104 to interface with the RBS 106. In some implementations, the seal gland 108 can be selectably fastened to the RBS 106 to maintain its orientation while the shaft 104 rotates within.

Figure 2:
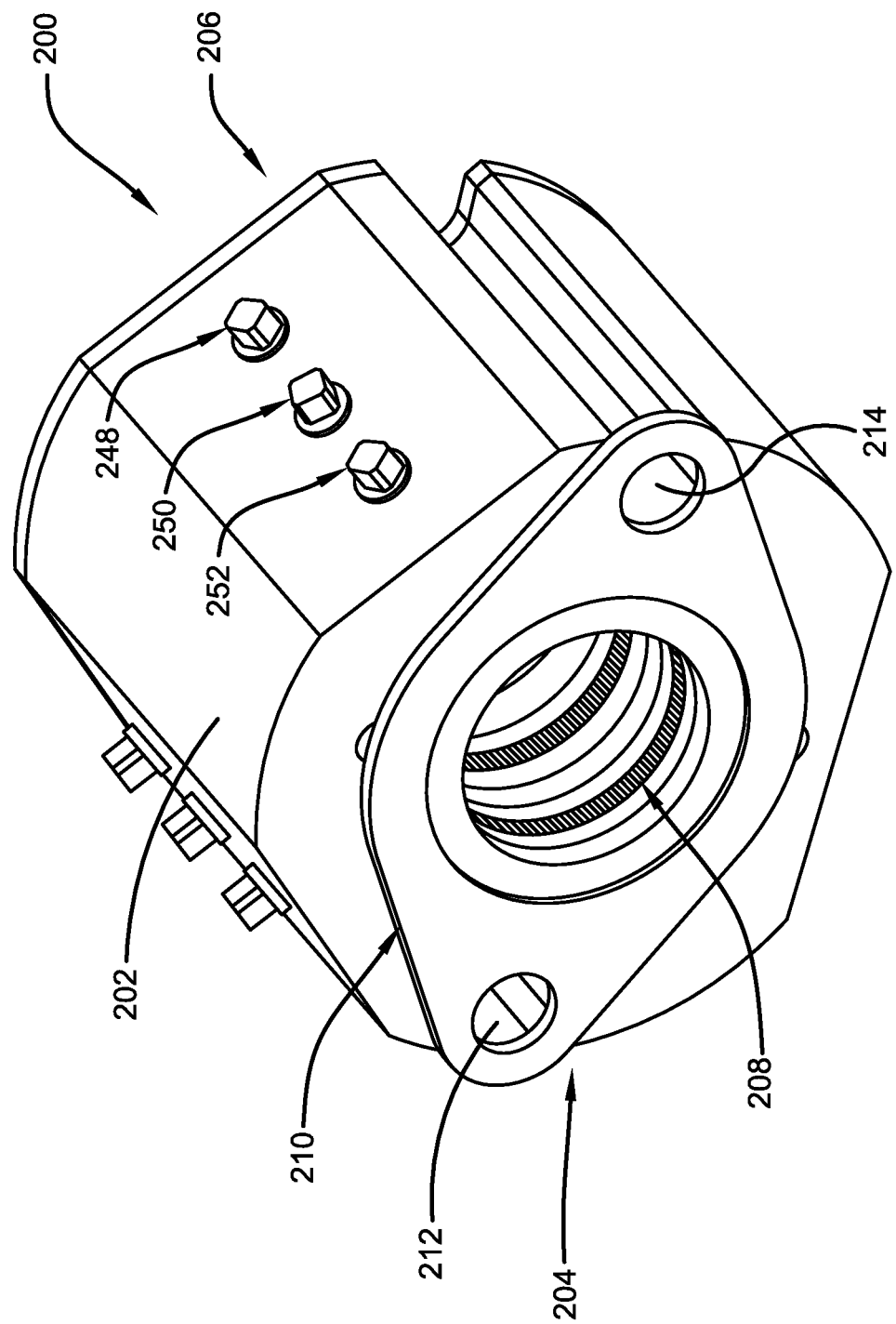
FIG. 2 is a component diagram illustrating an example implementation of a seal gland.

The seal gland 108 may be provided in multiple embodiments. FIG. 2 is a component diagram illustrating one implementation of an example seal gland 200 that can be mounted to the pump, such as flush mounted to the RBS 106 or the shaft casing of the pump. In this implementation, the example seal gland 200 can comprise a body 202 having a first end 204 and a second end 206, and an internal chamber 208 (e.g., or multiple chambers). The body also includes a tube portion 208 extending from the first end 204 to the second end 206. As an example, the body 202 may be formed as a one-piece member, or may be constructed as separate pieces (e.g., two or more) that are secured together (e.g., welded, soldered, glued, fastened, or otherwise fixedly engaged). A gasket seal 210 may also be provided at the first end 204 or the second end 206. The gasket seal 210 can be positioned flush on either the first end 204 or the second end 206 of the seal gland 200. It should be appreciated that the gasket seal can be located at whichever end of the seal gland 200 interfaces with the RBS 106 or the shaft casing of the pump. For example, the seal gland 200 can be slid down the shaft 104 and coupled to the RBS 106 such that the gasket seal 210 is compressed, therefore providing a seal and leakage protection between the mating surfaces of the seal gland 200 and the RBS 106. The seal gland 200 adapts to and is secured to the RBS 106 by fasteners inserted through fastener receivers 212 and 214. In certain embodiments, the seal gland 200 may be fastened to the RBS 106 at existing fastener locations on the RBS 106.

Further, in this example, with reference to FIG. 3, as described in more detail below for FIG. 6 and others, the interior chamber 208 can be fluidly coupled with a corresponding lubrication channel 242, 244, 246 to fluidly couple the interior chamber 208 with the exterior of the seal gland 200. As an example, the interior chamber 208 can comprise multiple chambers (as described below), which can comprise a corresponding lubrication channel 242, 244, 246 and port 248, 250, 252 that allows a user to, for example, add lubrication such as an appropriate lubricant (e.g., grease or oil that is appropriate for the operational use situation) to the chambers. Additionally, in some implementations, the lubrication channel 242, 244, 246 can have an inlet and corresponding outlet port to allow lubricant to flow into and out of the interior chamber 208.

Figure 3:
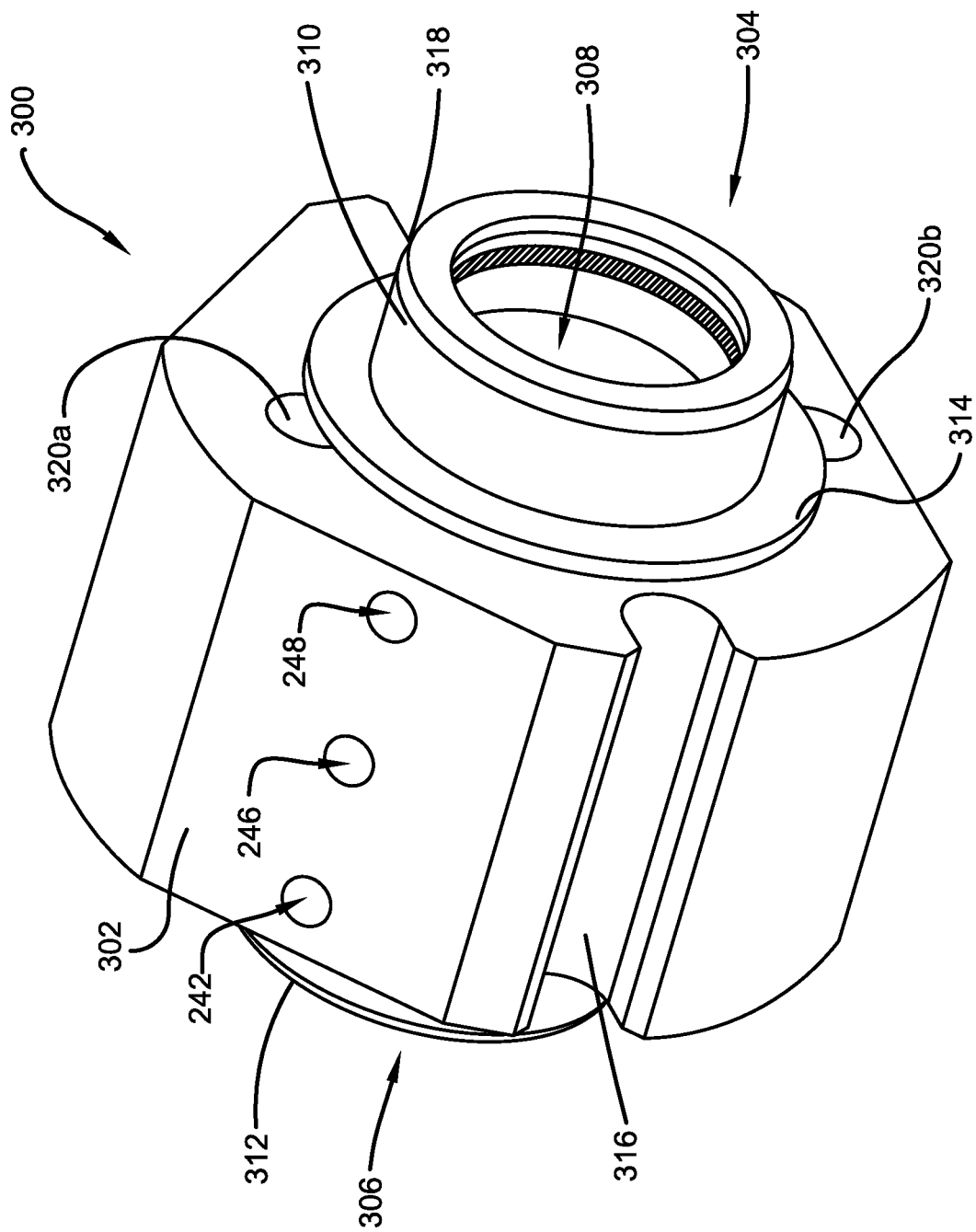
FIG. 3 is a component diagram illustrating an example implementation of a seal gland.

FIG. 3 is a component diagram illustrating one implementation of an example seal gland 300 that can be mounted by being piloted into the RBS 106. In this implementation, the example seal gland 300 can comprise a body 302 having a first end 304 and a second end 306. The body also includes a tube portion 308 extending from the first end 304 to the second end 306. As an example, the body 302 may be formed as a one-piece member, or may be constructed as separate pieces that are secured together (e.g., welded, soldered, glued, fastened, or otherwise fixedly engaged). The tube portion 308 extends outside of the body 302 at both the first end 304 and the second end 306 to form a first pilot 310 and second pilot 312. In an embodiment, the first pilot 310 and the second pilot 312 have an outer diameter sized such that the first pilot 310 and the second pilot 312 may fit into an opening of the RBS 106 or the shaft casing portion of the of the pump housing. A gasket seal 314 may also be provided at the first end 304 or the second end 306. The gasket seal 314 can have an annular shape to fit around the first pilot 310 and/or the second pilot 312, and positioned at whichever end of the seal gland 300 interfaces with the RBS 106. For example, the seal gland 300 can be slid down the shaft 104 and coupled to the RBS 106 such that the gasket seal 314 is compressed, therefore providing a good seal and leakage protection between the mating surfaces of the seal gland 300 and the RBS 106. The seal gland 300 adapts to and is secured to the RBS 106 or the shaft casing of the pump by fasteners inserted through fastener receivers 316 and 318. In certain embodiments, the seal gland 300 may be fastened to the RBS 106 at existing fastener locations on the RBS 106.

Additionally, as illustrated in FIG. 3, one or more removal ports 320a, 320b, which can be used to facilitate selective removal of the seal gland 300 from the RBS 106. In one implementation, a jack bolt (not shown) can be inserted into respective one or more removal ports 320a, 320b, and threaded into a threaded portion of the removal port 320a, 320b. In this implementation, for example, once the jackbolt(s) is coupled with the seal gland 300, they may be used to pull the seal gland 300 apart from the RBS 106 using an appropriate tool or other device.

Figure 4:
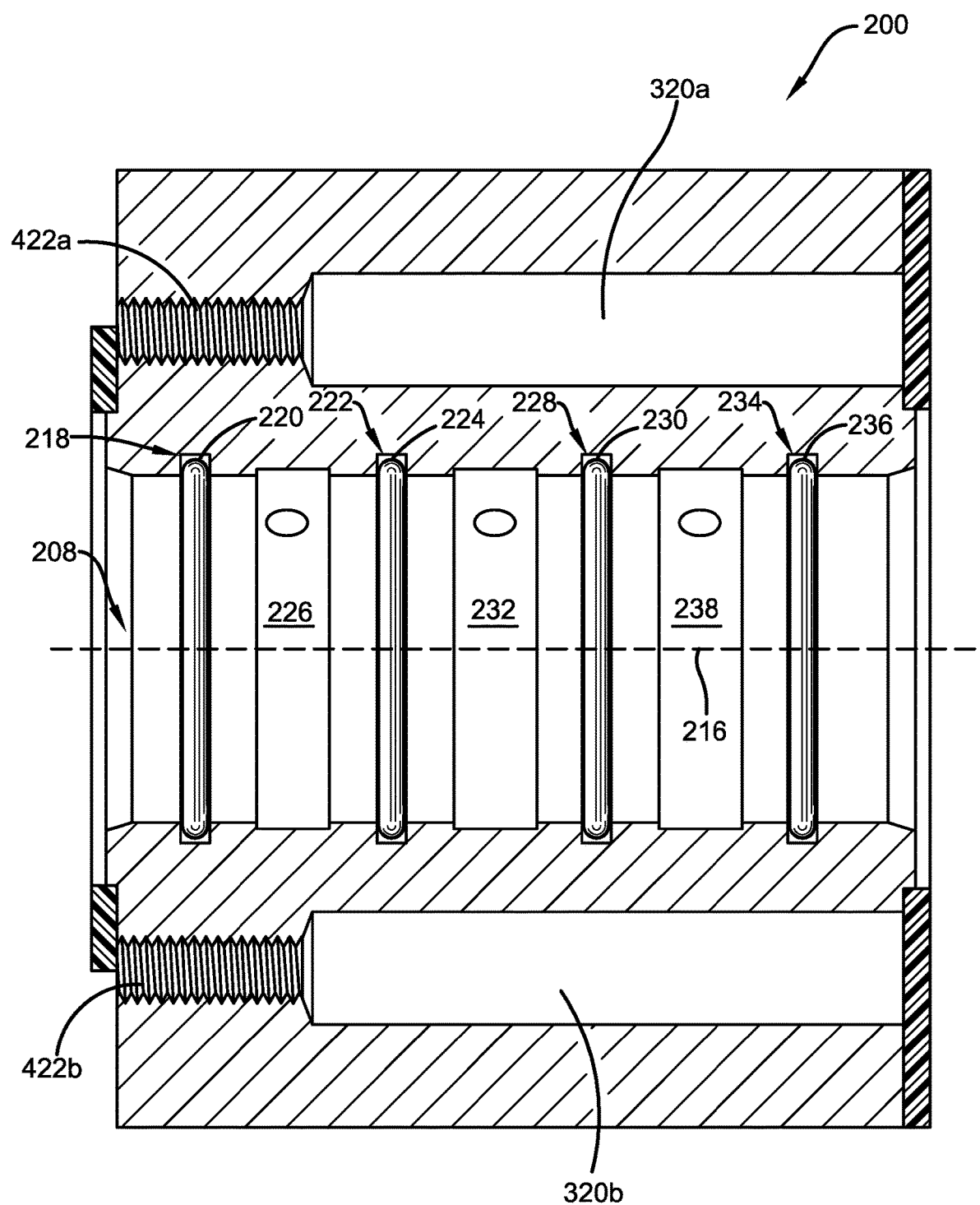
FIG. 4 is a component diagram illustrating a cut-away view of an example implementation of a seal gland.

Turning now to FIG. 4, the example seal gland 200 is shown. While FIG. 4 depicts the flush mount embodiment of seal gland 200, it should be appreciated that the internal components that are depicted can also be included and arranged in the piloted embodiment of seal gland 300 in a similar or same arrangement. In the example seal gland 200, the tube portion 208 extends along a central axis 216, and comprises an inner diameter that is configured to selectably receive a rotating shaft 104 of a pump 100. The seal gland 200 can comprise a series of inner, circumferential channels 218, 222, 228, 234 disposed inside of the tube portion 208. The seal gland 200 can also include two or more seal elements 220, 224, 230, 236 disposed within the channels 218, 222, 228, 234. The seal elements 220, 224, 230, 236 can be considered dynamic as they are in contact with the rotating shaft 104 during operation to provide a seal to mitigate leakage of pumped fluid along the shaft 104. The seal elements 220, 224, 230, 236 can operably form chambers 226, 232, 238 between one another that act as a lubricant reservoir.

Multiple sealing elements 220, 224, 230, 236 are present to act in a redundant manner and extend overall seal life. Between each pair of seal elements 220, 224, 230, 236, a chamber is present to act as a lubricant reservoir and a potentially needed expansion volume for the thermal expansion of the lubricant. The individual chambers 226, 232, 238 can be used to contain lubricant and regulate the internal chamber pressure with lubricant filling and pressure relief fittings.

In the example seal gland 200, a first channel 218 can be configured to house a first seal element 220, such as an O-ring, gasket, or lip seal, that provides a seal between the seal gland 200 and the rotating shaft 104 of the pump 100. The example seal gland 200 can comprise a second channel 222 disposed distally from the first channel 218 inside the tube portion 208. The second channel 222 can be configured to house a second seal element 224, such as an O-ring, gasket, or lip seal, that provides an additional seal between the seal gland 200 and the rotating shaft 104 of the pump 100. The first seal element 220 and the second seal element 224 form a first chamber 226 between the first seal element 220 and the second seal element 224. The first chamber 226 can act as a lubricant reservoir to hold lubricant such as oil or grease. As an example, use of such lubricant can help reduce friction and frictional heat between the dynamic sealing elements (e.g., 220, 222, 224, 226) and rotating shaft (e.g., 104) to extend the life of both components. The lubricant can also serve as a barrier fluid to inhibit the release of gaseous emissions from the pumped liquid, which may be an undesired release to the environment. The example seal gland 200 can also include a third channel 228 disposed distally from the second channel 222 inside the tube portion 208. The third channel 228 can be configured to house a third seal element 230, such as an O-ring, gasket, or lip seal, that provides an additional seal between the seal gland 200 and the rotating shaft 104 of the pump 100. The second seal element 224 and the third seal element 230 form a second chamber 232 between the second seal element 224 and the third seal element 230. The second chamber 232 can act as an additional lubricant reservoir. The example seal gland 200 can also include a fourth channel 234 disposed distally from the third channel 228 inside the tube portion 208. The fourth channel 234 can be configured to house a fourth seal element 236, such as an O-ring, gasket, or lip seal, that provides an additional seal between the seal gland 200 and the rotating shaft 104 of the pump 100. The third seal element 230 and the fourth seal element 236 form a third chamber 238 between the third seal element 230 and the fourth seal element 236. The third chamber 238 can act as an additional lubricant reservoir. In certain embodiments, the channels 218, 222, 228, 234 and corresponding sealing elements 220, 224, 230, 236 may have an asymmetrical internal layout as described in greater detail with respect to FIG. 5. It should be appreciated that while the example seal gland 200 is depicted with four channels and corresponding seal elements, a seal gland can have two or more channels and corresponding seal elements.

As illustrated, the example sealing gland 200 can comprise the one or more removal ports 320a, 320b disposed in the body 202 of the sealing gland 200. As described above, the respective removal ports 320a, 320b can be configured to operably receive a removal tool, such as a jack bolt, that can be selectably coupled with the body 202 of the sealing gland 200. As an example, a threaded tool (not shown) can be threadedly engaged with a threaded portion 422a, 422b of the corresponding removal port 320a, 320b. In this way, for example, the seal gland 300 can be selectably removed from the RBS 106 using an appropriate tool or other device.

Figure 5:
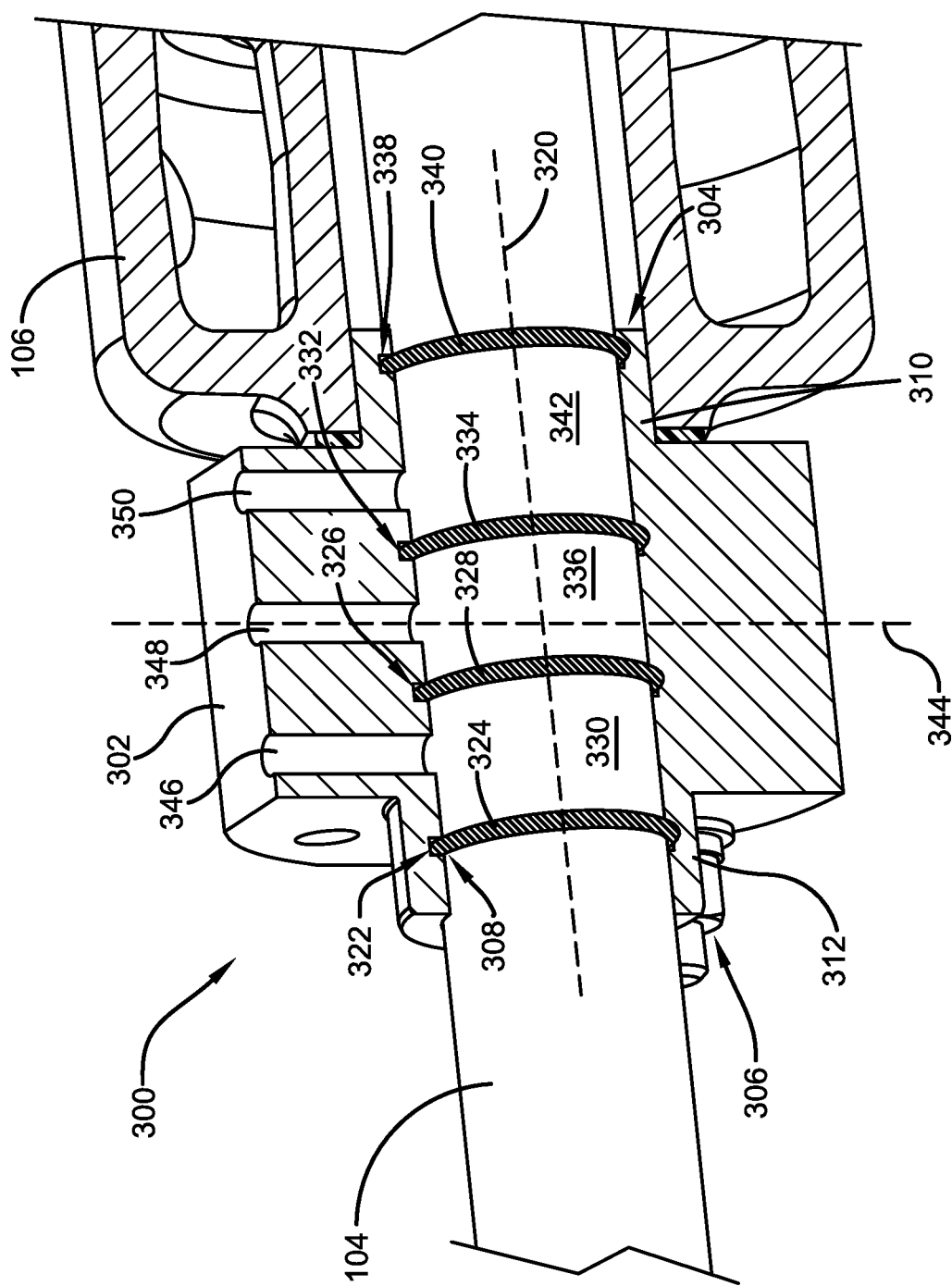
FIG. 5 is a component diagram illustrating a cut-away view of an example implementation of a seal gland installed on a pump shaft.

Turning now to FIG. 5, an example seal gland 300 installed on a pump shaft 104 is shown. While FIG. 5 depicts the piloted embodiment of seal gland 300, it should be appreciated that the internal components as depicted can also be included and arranged in the flush mount embodiment of seal gland 200. The seal gland 300 is depicted as being installed onto the pump shaft 104 such that the first pilot 310 is inserted within the RBS 106 or shaft casing of the pump 100. As an example, in this implementation, the first pilot 310 (e.g., or the second pilot 312) can be used to help center and dispose the example seal gland 300 appropriately in the RBS 106, to provide for an appropriate alignment on the shaft 104. That is, for example, the shaft 104 can be operably supported by outboard bearings, which can allow for loose tolerances between outer diameter of the shaft 104 and the inner diameter of the seal 302. In comparison, the example seal 200 in FIG. 2 may be a non-piloted version of a seal. That is, seal 200 does not comprise a pilot, and is directly fastened to the RBS 106 and shaft 104. In this way, in this example, the non-piloted seal version may offer more flexibility to accommodate pump/seal/shaft runout by allowing the seal to be adjusted/positioned after the pump and motor coupling is aligned (e.g., after initial operation of the shaft). This may allow the seal to perform better in some circumstances.

Because the seal gland 300 is reversible, the seal gland 300 may also be flipped and installed on the pump shaft 104 with the second pilot 312 inserted within the RBS 106 or shaft casing. In the example seal gland 300, the tube portion 308 extends along a central axis 320, and comprises an inner diameter that is configured to receive the rotating shaft 104 of a pump 100. Similar to the seal gland 200 depicted in FIG. 4, the seal gland 300 can comprise a series of circumferential channels 322, 326, 332, 338 disposed inside of the tube portion 208 and a series of sealing elements 324, 328, 334, 340 disposed within the respective channels 322, 326, 332, 338 to create chambers 330, 336, 342 therebetween.

Each chamber 330, 336, 342 can have a corresponding lubrication channel 346, 348, 350 to fluidly couple each chamber 330, 336, 342 to the exterior of the seal gland 300. Each lubrication channel 346, 348, 350 can have a corresponding port (as shown with respect to seal gland 200 in FIG. 6) that allows a user to, for example, add lubrication such as grease or oil to the chambers 330, 336, 342.

Another aspect of the seal gland 300 is the incorporation of an asymmetrical internal seal element 324, 328, 334, 340 layout that allows the seal gland 300 to be rotated 180° and reinstalled on the same rotor or shaft 104 assembly while providing a clean and unblemished surface on the shaft 104 for contacting each of the seal elements 324, 328, 334, 340. Along with the seal elements 324, 328, 334, 340 themselves, the outer surface of the pump shaft 104 may be worn by the friction caused by contacting the seal elements 324, 328, 334, 340, resulting in grooves at the location of contact by the seal elements 324, 328, 334, 340. By providing a new location on the surface of the pump shaft 104 for a seal element 324, 328, 334, 340 to operate, the rotor and shaft 104 assembly can be reused without significant repair or replacement.

The asymmetrical internal seal element 324, 328, 334, 340 layout is depicted in FIG. 5. The channels 322, 326, 332, 338 and corresponding seal elements 324, 328, 334, 340 are arranged along the inside of the tube portion 308 asymmetrically with respect to the midpoint 344 of the body 302. In an exemplary embodiment, the seal gland 300 may be installed on the pump shaft 104 with the first end 304 of the seal gland 300 coupled with the RBS 106 or shaft casing. After operating the pump 100 over a period of time, the seal elements 324, 328, 334, 340 can blemish (e.g., wear grooves in) the outer surface of the pump shaft 104. As an example, when these locations on the shaft 104 are worn excessively, the integrity of the seal created by the seal gland 300 can be compromised. In this example, rather than repairing or replacing the pump shaft 104 in these situations, the pump gland 300 may simply be reversed and reinstalled.

For example, a user may remove the seal gland 300 from the pump shaft 104, replace seal elements 324, 328, 334, 340, rotate the seal gland 300 one-hundred-eighty degrees, and re-install the seal gland 300 on the pump shaft so that the second end 306 of the seal gland is coupled with the RBS 106 or shaft casing. In this example, when re-installed in this rotated position, the seal elements 324, 328, 334, 340 can make contact with the surface of the pump shaft 104 at different locations as the previously blemished (e.g., grooved) locations. In one implementation, as illustrated in FIG. 5, once the seal gland is reversed and re-installed, the newly replaced seal elements 324, 328, 334, 340 may be operably disposed at locations that are disposed within the previous chambers 330, 336, 342. In this implementation, this may mitigate operating on the prior blemished surface locations of the shaft 104, which may have been a result of the prior seals operating on the shaft 104, and/or the shaft 104 contacting the tube portion 308 during operation.

Figure 6:
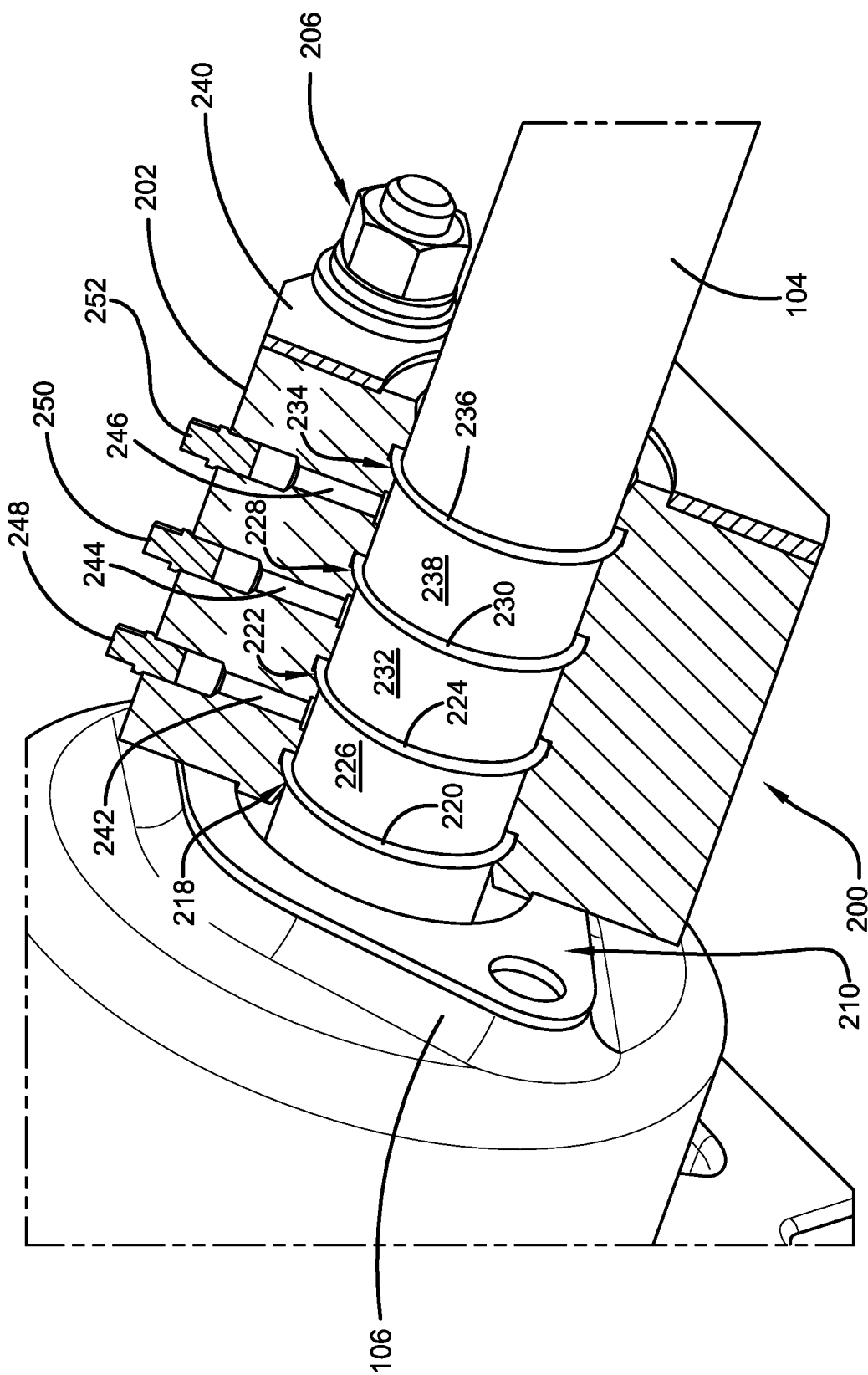
FIG. 6 is a component diagram illustrating a cut-away view of an example implementation of a seal gland installed on a pump shaft.

FIG. 6 depicts an example seal gland 200 installed on a pump shaft 104. The seal gland 200 is depicted as a non-piloted version that is installed onto the pump shaft 104 such that the first end 204 is flush mounted with the RBS 106 or shaft casing of the pump 100, with the gasket 210 creating a seal therebetween. Because the seal gland 200 is reversible, the seal gland 200 may also be flipped and installed on the pump shaft 104 with the second end 206 flush mounted with the RBS 106 or shaft casing. As previously discussed, the seal gland 200 may be coupled to the RBS 106 or the shaft casing by way of fasteners inserted through fastener receivers 212 and 214. Because the seal gland 200 is reversible, the external mounting face (whichever of the first end 204 or second end 206 is not coupled to the RBS 106 or shaft casing) and the fastener receivers 212 and 214 are exposed on the distal end of the seal gland 200. The external mounting face can be protected by an end cap 240 to prevent scratches and corrosion that may allow leakage when the seal gland 200 is reversed, as well as mitigating introduction of contaminants into the one or more removal ports (e.g., 320a, 320b).

In this implementation, respective chambers 226, 232, 238 can be fluidly coupled with a corresponding lubrication channel 242, 244, 246 to fluidly couple respective chambers 226, 232, 238 with the exterior of the seal gland 200. Respective lubrication channels 242, 244, 246 can comprise a corresponding port 248, 250, 252 that allows a user to, for example, add lubrication such as an appropriate lubricant (e.g., grease or oil that is appropriate for the operational use situation) to the chambers 226, 232, 238. In some implementations, the seal body 202 can comprise a second set of lubrication channels (not shown), that are fluidly coupled with the corresponding chambers 226, 232, 238. In this implementation, the second set of lubrication channels can be radially offset by ninety (90) degrees offset about the shaft axis from the first set of lubrication channel 242, 244, 246. However, it should be noted that the sets of lubrication channels can be offset at any chosen angle, selected for convenience of access, installation, engineering principles, and/or use. In this implementation, for example, having a first set of lubrication channel 242, 244, 246 and a second set of lubrication channels (not shown) may allow lubricant to be added from one set and air (e.g., or excess lubricant) to be purged from the other through the corresponding port (e.g., 248, 250, 252), which can comprise a relief fitting. (e.g. spring loaded check valve) In this way, in this example, this can mitigate undesired internal chamber pressure. For example, the individual ports 248, 250, 252 can also be used to regulate the internal chamber pressure with grease filling fittings and pressure relief fittings. Additionally, the ports 248, 250, 252 that are connecting the exterior of the seal gland 200 to the chambers 226, 232, 238 may serve to detect progressive seal failure, for example, if pumped liquid (e.g., or a seal break indictor) is visibly present in the grease expelled through the pressure relief fitting when new grease is added.

Figure 7A:
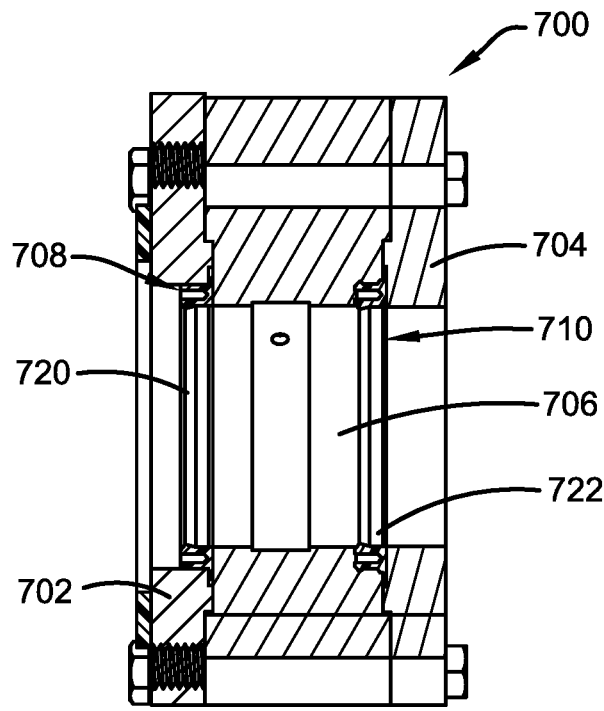
FIG. 7A is a component diagram illustrating a cut-away view of an example implementation of a modular seal gland.
Figure 7B:
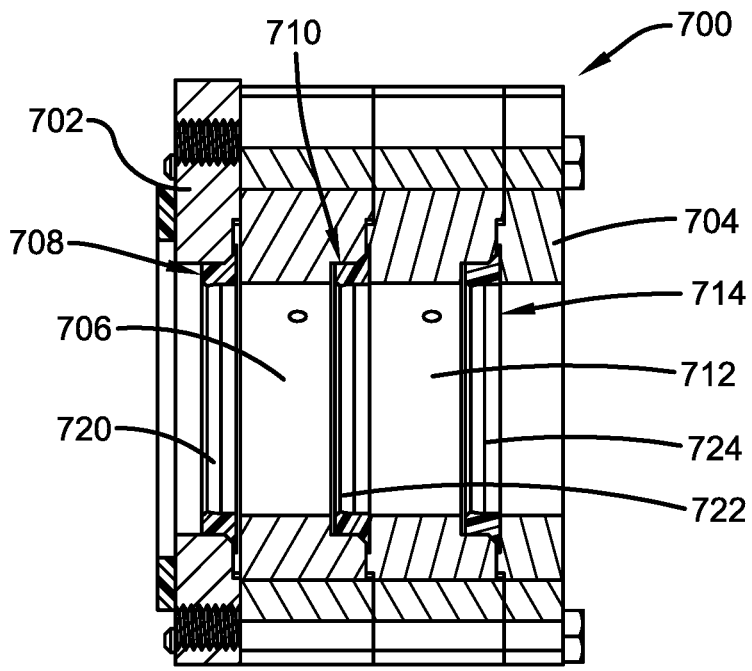
FIG. 7B is a component diagram illustrating a cut-away view of an example implementation of a modular seal gland.

Turning now to FIGS. 7A and 7B, a modular design of an example seal gland 700 is depicted. The modularity can allow for a user to customize the seal gland 700 by selecting the number of seal elements used by adding or removing modular components (e.g. 706, 712) that interface with each other. FIG. 7A shows an individual first modular component 706 that is interfaced with and between a first gland end component 702 and a second gland end component 704. In this configuration, a first channel 708 can be formed between the first end component 702 and the first modular component 706, in which a first seal, e.g. gasket, O-ring, or lip seal, 720 can be operably disposed. As an example, the first channel 708 can be formed in the first gland end component 702, can be formed in the first modular component 706, or be formed at least partially in both the first gland end component 702 and the first modular component 706 to form the first channel 708. Further, a second channel 710 is formed between the first modular component 706 and the second end component 704, in which a second lip seal 722 can be operably disposed. As an example, the second channel 710 can be formed in the second gland end component 704, can be formed in the first modular component 706, or be formed at least partially in both the second gland end component 704 and the first modular component 706 to form the second channel 710.

FIG. 7B shows the first modular component 706 coupled with a second modular component 712, stacked externally, with both modular components 706, 712 interfaced between the first end component 702 and the second end component 704. In this configuration, as described above, the first channel 708 is formed between the first gland end component 702 and the first modular component 706; and the second channel 710 is formed between the first modular component 706 and the second modular component 712. Additionally, in this implementation, a third channel 714 is formed between the second modular component 712 and the second gland end component 704. As an example, the third channel 714 can be formed in the second gland end component 704, can be formed in the second modular component 712, or be formed at least partially in both the second gland end component 704 and the second modular component 712 to form the third channel 714. The third channel 714 can be configured to operably hold a third seal 724.

As an illustrative example, after operating the pump 100 over a period of time, the asymmetrically-located seal elements in channels 720, 722 and 724 can blemish (e.g., wear grooves in) the outer surface of the pump shaft 104. As an example, when these locations on the shaft 104 are worn excessively, the integrity of the seal created by the seal gland 700 can be compromised. In this example, rather than repairing or replacing the pump shaft 104 in these situations, the pump gland 700 may simply be reversed and reinstalled, providing a clean and unblemished surface on the shaft 104 for contacting each of the seal elements.

Figure 8:
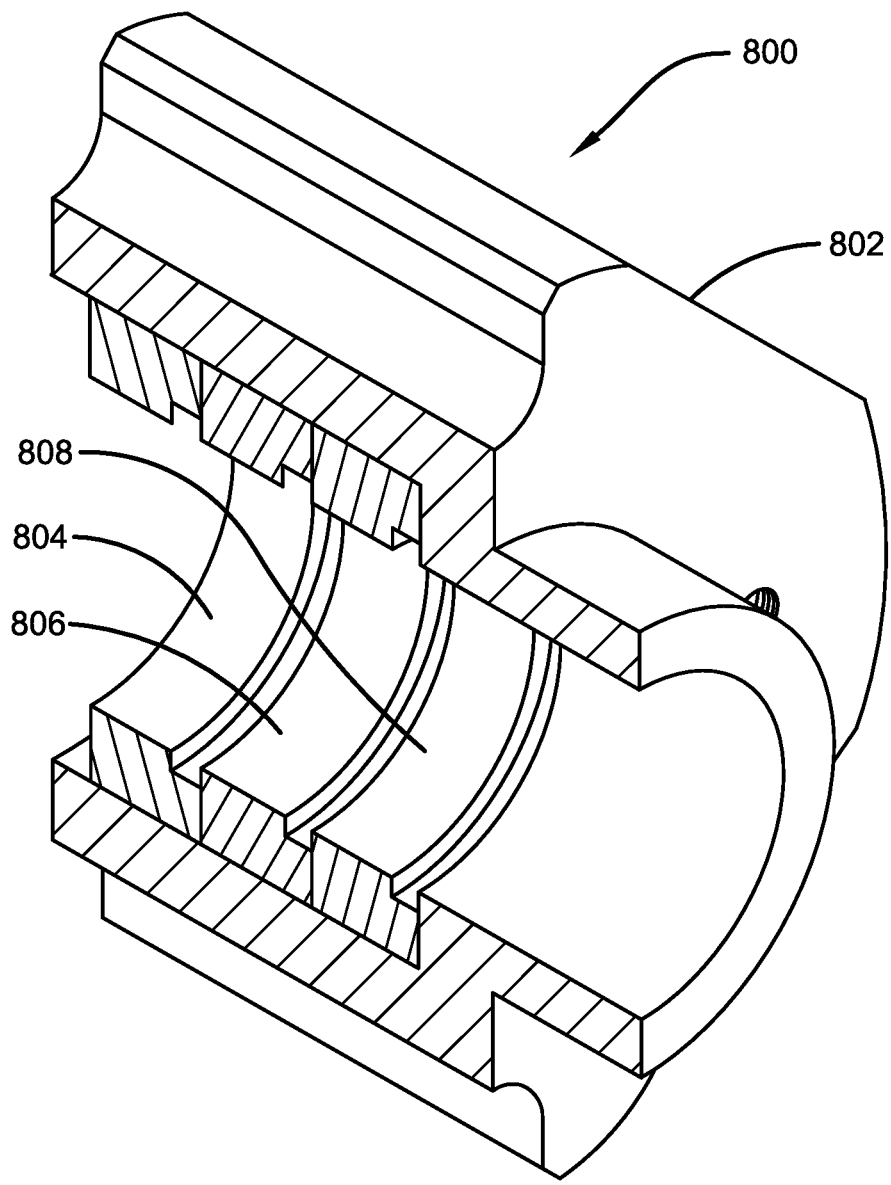
FIG. 8 is a component diagram illustrating a cut-away view of an example implementation of a seal gland.

FIG. 8 depicts another embodiment of a modular seal gland 800. The modular seal gland 800 includes a body 802 that serves as a chassis for internal modular components (e.g. 804, 806, 808) that can be inserted to create varying numbers of channels and corresponding chambers.

Figure 9:
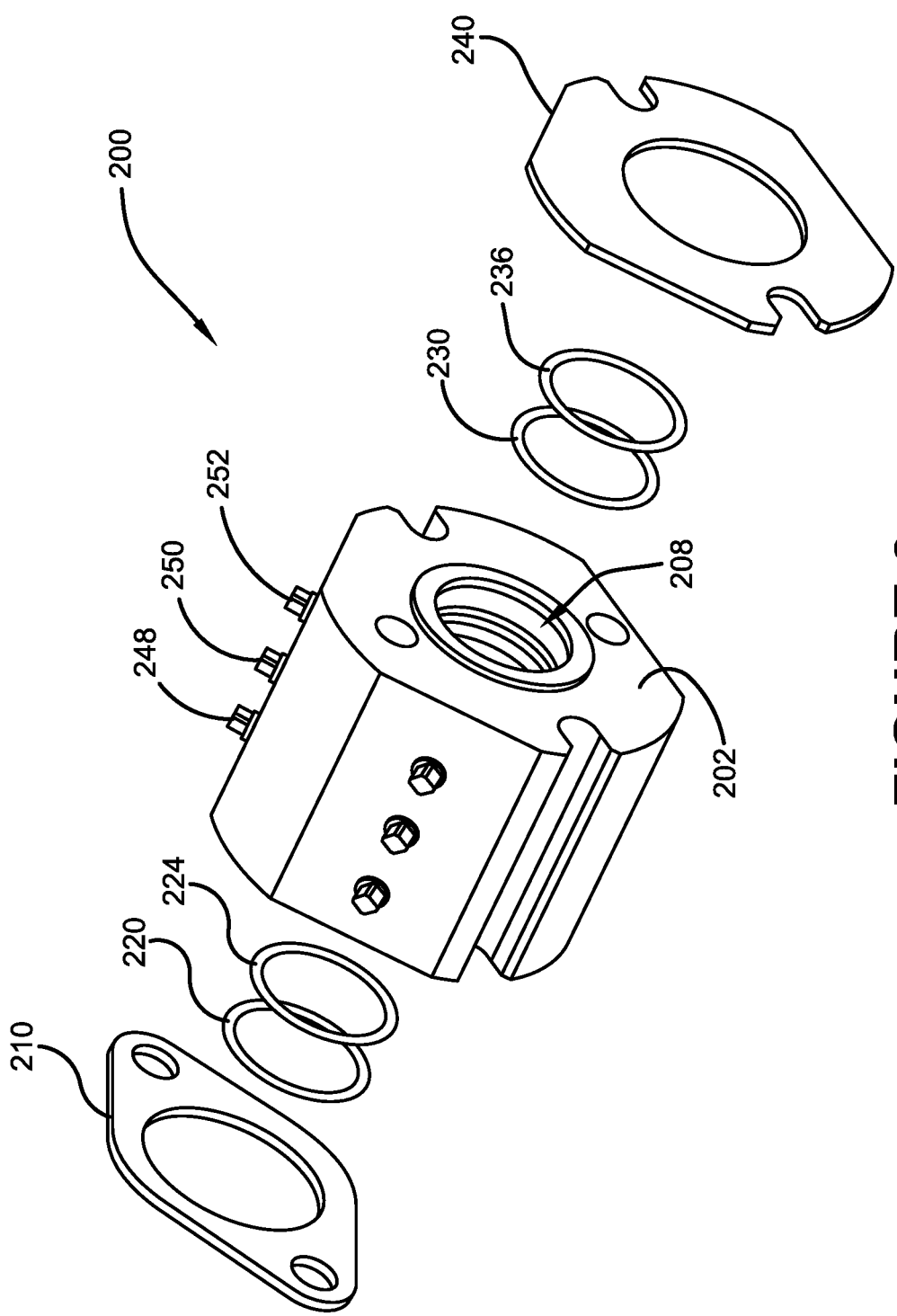
FIG. 9 is an exploded view of an example implementation of a seal gland.

FIG. 9 is an exploded view of the seal gland 200 shown in its flush mounted embodiment. The particular embodiment depicts four seal elements that are O-rings 220, 224, 230, 236.

Figure 10:
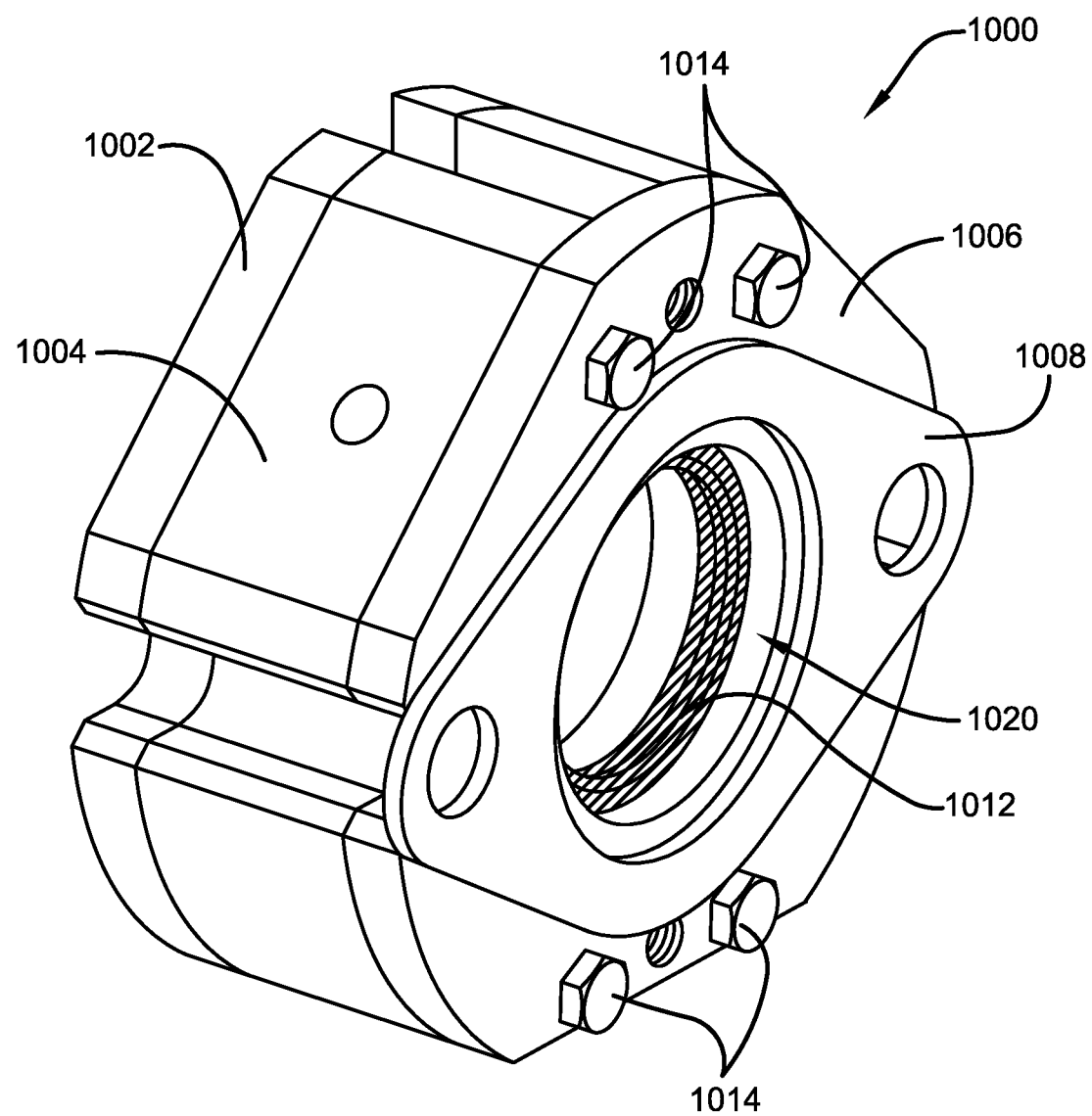
FIG. 10 is a component diagram illustrating an example implementation of a seal gland.
Figure 11:
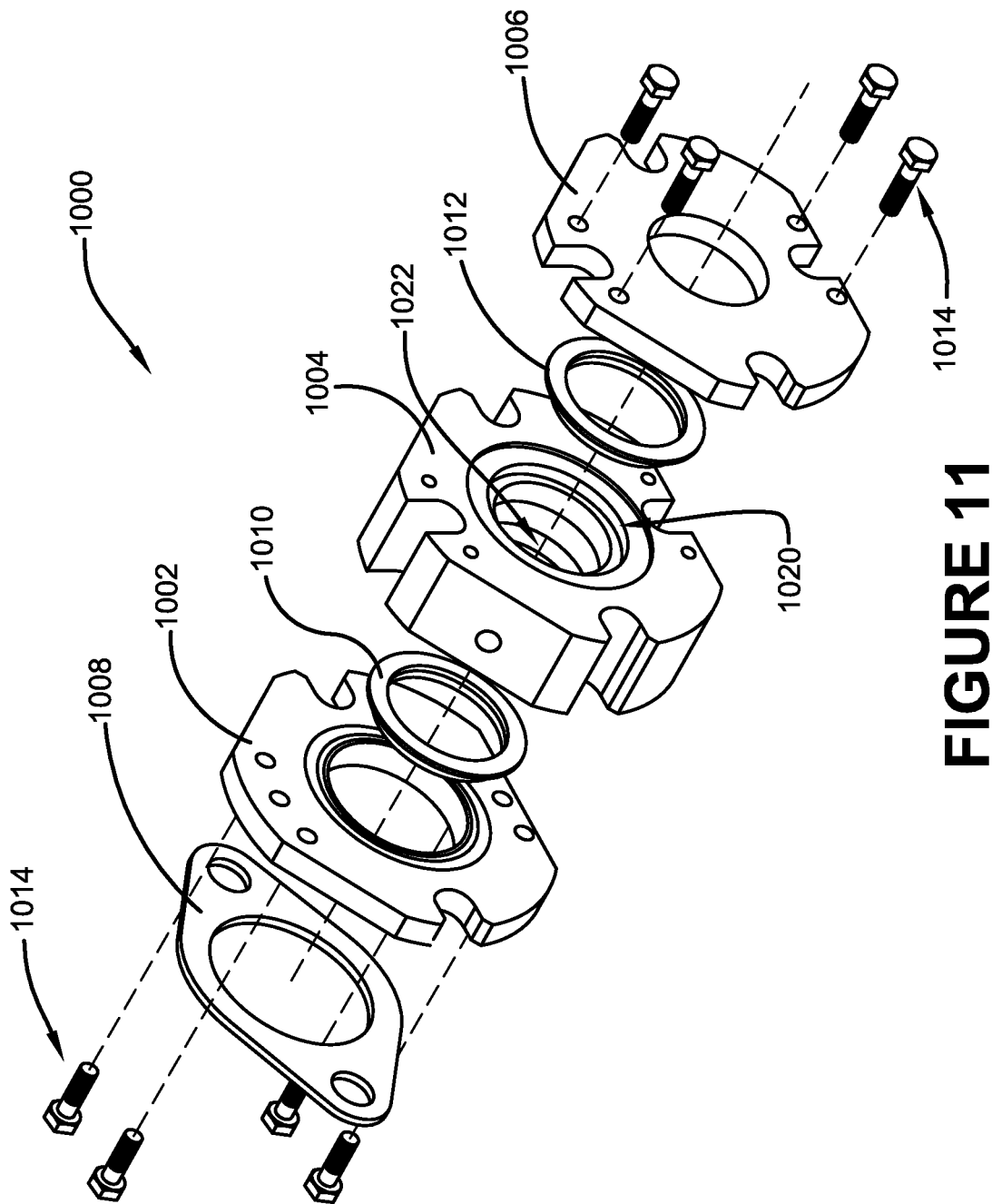
FIG. 11 is an exploded view of an example implementation of a seal gland.

FIGS. 10 and 11 depict another example of an alternate embodiment of a seal gland 1000. The exemplary seal gland 1000 is of the external modular variety, having a first end component 1002, a first modular element 1004, a second end component 1006, and a gasket 1008. The seal gland 1000 can comprise one or more channels 1020, 1022 that are configured to operably to respectively hold a seal element, such as lip seals 1010, 1012. In some implementations, the seal glands of the external modular variety (e.g. seal gland 700 and seal gland 1000) may be held together by way of fasteners 1014 such as screws, bolts, etc. Further, in some implementations, the seal gland 1000 may be configured to be non-reversible, such that rotating (e.g., reversing) the disposition of the gland 1000 on the shaft does not alter the location of the sealing elements (e.g., 1010, 1012) on the shaft (not shown). In other implementations, the seal gland 1000 can be configured to be reversible, such that rotating (e.g., reversing) the disposition of the gland 1000 on the shaft does alter the location of the sealing elements (e.g., 1010, 1012) on the shaft (not shown), such that the location of the channels (e.g., 1020, 1022) are offset and result in placement of the respective sealing elements at a different location when in the reverse position.

FIG. 11 is an exploded view of the seal gland 1000. The particular embodiment depicts two seal elements 1010, 1012 that are lip seals.

Figures 12A, 12B:
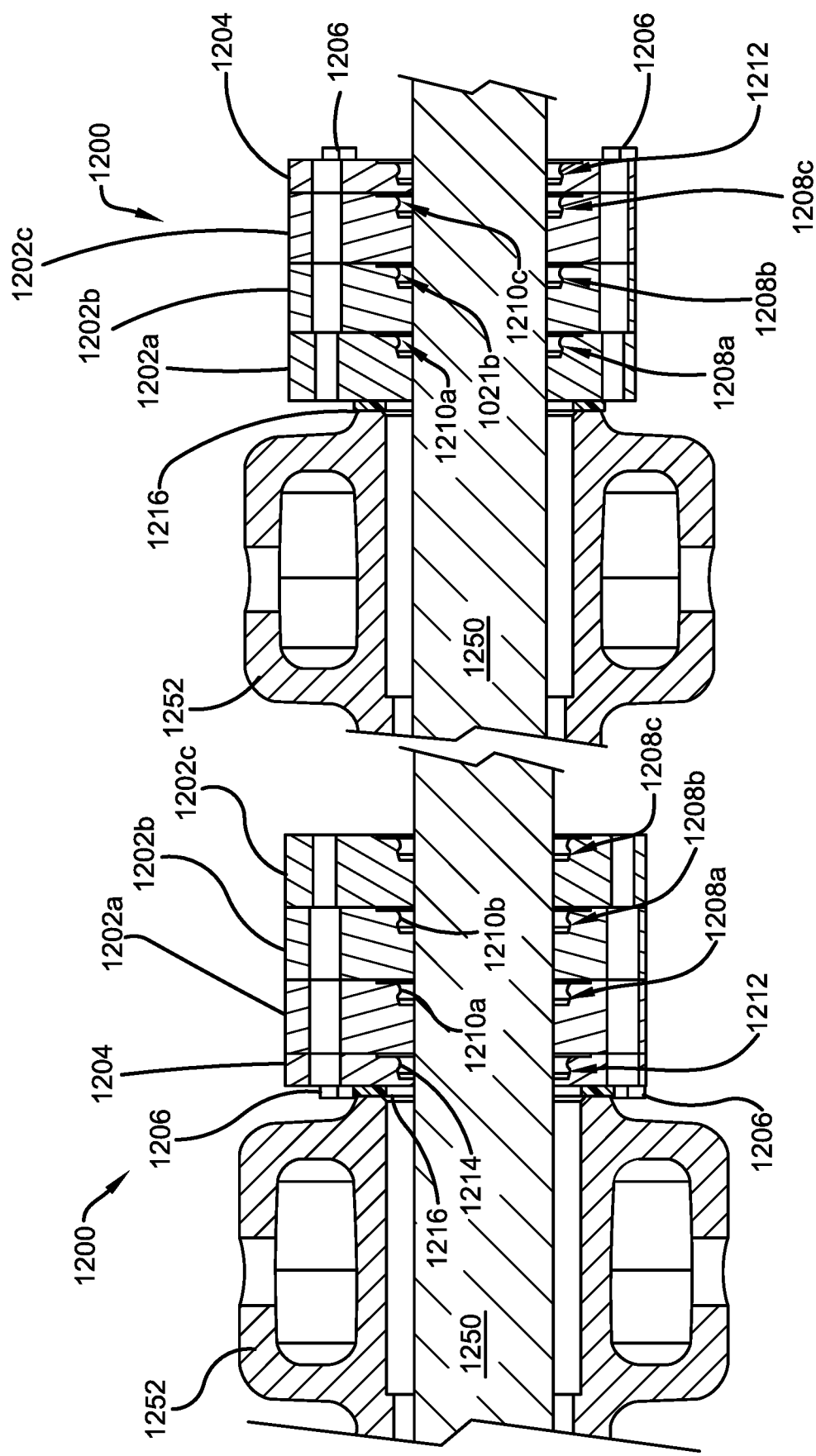
FIGS. 12A and 12B are component diagrams that illustrate a cut-away view of one example implementation of a seal gland installed on a pump shaft.

FIGS. 12A and 12B are component diagrams that illustrate an example implementation of a seal gland 1200 in cut-away, disposed on a pump shaft 1250. In this implementation, the seal gland 1200 is a modular design where a plurality (e.g., two or more) of modular sections or modular gland sections 1202a, 1202b, 1202c (e.g., first, second, third), can be stacked together to form a portion of the seal gland 1200. Further, in this implementation, a spacer element 1204 (e.g., a third modular section when merely two other modular sections are present, or a fourth modular section when three other modular sections are present) can be combined with the gland sections 1202a, 1202b, 1202c disposed toward the pump end of the shaft 1250 (FIG. 12A), or alternately, toward the motor end the shaft 1250 (FIG. 12B). The spacer 1204 and gland sections 1202a, 1202b, 1202c can be operably coupled together to form the seal gland 1200 using one or more fasteners.

Respective gland sections 1202a, 1202b, 1202c can comprise an annular channel 1208a, 1208b, 1208c that is configured to operably receive and hold a seal element 1210a, 1210b, 1210c, such as an O-ring, gasket, lip seal, or the like. Further, the spacer 1204 can comprise an annular channel 1212 that is configured to operably receive and hold a spacer seal element 1214. The respective seal elements 1210a, 1210b, 1210c, 1214 comprise dynamic seal elements that operably provide on the rotating shaft 1250 to mitigate fluid leakage along the shaft 1250. That is, for example, the respective seals 1210a, 1210b, 1210c, 1214 can be compressed against the shaft 1250 by the sections 1202a, 1202b, 1202c and spacer 1204 to form a seal along the shaft 1250. Additionally, additional sections may be added to increase the sealing ability of the seal gland 1200, depending on operational conditions, the type of fluid being pumped, and desired leak mitigation.

In some implementations, the seal gland 1200 can be reversed to provide for a longer useful life and improved leak mitigation over time. That is, for example, as illustrated in FIGS. 12A and 12B, the spacer 1204 can be selectably interchangeable between a first position (e.g., at the distal end of the body of the gland) and a second position (e.g., at the proximal end of the body of the gland). In this example, the spacer 1204 disposes the respective seal elements 1210a, 1210b, 1210c, 1214 at a first location on the shaft 1250 in FIG. 12A. During operation, over time, the shaft 1250 may begin to develop wear at the first location of the respective seal elements 1210a, 1210b, 1210c, 1214. In this example, a depression may form that can reduce the effectiveness of the sealing ability of the seal gland 1200, such as due to less compression of the seal element at that location. As an example, the operator of the pump can selectably remove the spacer 1204 from its position in FIG. 12A, and move it to the position in FIG. 12 B. In this example, the respective seals 1210a, 1210b, 1210c, 1214 are now disposed at a second location on the shaft 1250 in FIG. 12B. In this way, the seals are disposed at a location that does not exhibit wear (e.g., a depression), which can allow the respective seals 1210a, 1210b, 1210c, 1214 to provide improved sealing ability, thereby mitigating leakage. As such, for example, the life of the shaft 1250 can be extended to twice as long, as it may not need to be replaced after the wear formed in the first position.

In some implementations, the third modular gland section 1202c (e.g., or spacer 1204) can have a width that is less than the first and second sections 1202a, 1202b. In this way, the third modular gland section can be interchangeable between a distal end of the first modular gland section 1202a and a proximal end of the second modular gland section 1202b. In other implementations, the spacer 1204 can be interchangeable between the distal end of the first modular section 1202a and the proximal end of the third modular gland section 1202c. In this way, the modular gland sections 1202 can be moved between the first position and second position, resulting in a different placement of the respective seal elements 1210a, 1210b, 1210c, 1214.

In this implementation, a gasket seal 1216 (e.g., 210 of FIG. 2, 1008 of FIG. 10) may also be provided at a location between the rotor bearing sleeve (RBS) 1252 (e.g., 106 in FIGS. 1 and 5) and the distal end of the seal gland 1200. The gasket seal 1216 can be positioned flush to the distal end of the seal gland 1200. It should be appreciated that the gasket seal 1216 can be located at whichever end of the seal gland 200 interfaces with the RBS 1252 or the pump housing if an RBS is not present.

Figures 13A, 13B:
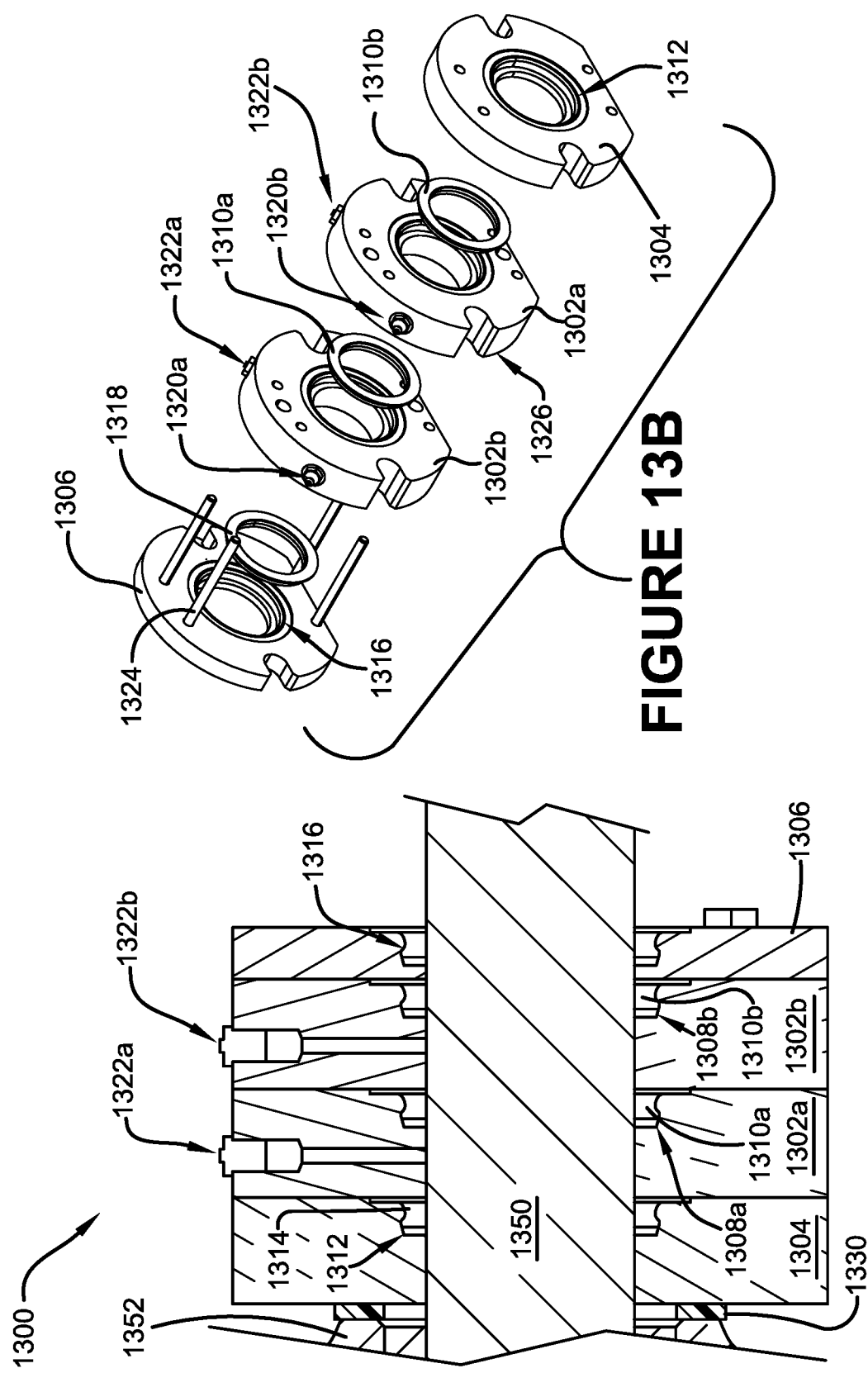
FIGS. 13A and 13B are component diagrams that illustrate a cut-away view and an exploded view of another example implementation of a seal gland installed on a pump shaft.

FIGS. 13A and 13B are component diagrams illustrating a cut-away view of an example seal gland 1300 operably disposed on a pump shaft 1350, and an exploded view of the example seal gland 1300. In this example, the seal gland 1300 can comprise one or more mid-sections 1302a, 1302b (e.g., first modular section, second modular section), a first end section 1304 (e.g., third modular section), and a second end section 1306. Further, the respective mid-sections 1302a, 1302b, first end section 1304, and second end section 1306 (e.g., fourth modular section can respectively comprise seal elements 1310a, 1310b, 1314, 1318, each disposed in a channel 1308a, 1308b, 1312, 1316. As described above, the respective seal elements (e.g., O-ring, gasket, lip seals, etc.) can mitigate leakage of fluid along the shaft 1350 during operation.

Additionally, in this implementation, the respective mid-section 1302a, 1302b can comprise a lubrication inlet port 1320a, 1320b and a lubrication outlet port 1322a, 1322b. In this implementation, the inlet ports 1320a, 1320b are fluid coupled with an interior wall of the mid-sections 1302a, 1302b to operably provide lubrication fluid to the seals 1310a, 1310b and shaft 1350 surface. A pressure fitting can be disposed at the opening of the inlet ports 1320a, 1320b to operably allow for the introduction of a lubricating product. In some implementations, the respective mid-sections can comprise a channel between in their interior wall to receive the lubricating material in a type of reservoir (e.g., as described above). The respective outlet ports 1322a, 1322b are fluidly coupled with the interior wall of the mid-sections 1302a, 1302b to provide for an outlet of excess lubricating material, and/or to provide an indication of pressure loss, such as when a seal element 1310a, 1310b, 1314, 1318 is damaged. In this example, a pressure indicator can be disposed at the respective outlet ports 1322a, 1322b to provide a visual indication of pressure loss.

In some implementations, the first end section 1304 and the second end section 1306 can comprise different widths/thicknesses, as illustrated. In this way, for example, the respective sections can be switched with each other to provide a different location for the seal elements 1310a, 1310b, 1314, 1318 to be operably disposed on the shaft 1350, as described above. That is, for example as illustrated in FIG. 13A, if the second end section 1306 was placed in the position of the first end section 1304, and vice versa, the respective seal elements 1310a, 1310b, 1314, 1318 are disposed at a different location than illustrated in FIG. 13A. In this way, when shaft wear is indicated at a first location of the respective seal elements 1310a, 1310b, 1314, 1318, they can be effectively moved to a second, unworn location.

As illustrated, one or more fasteners 1324 can be used to operably hold the respective sections together, and align with appropriate fastener holes in each section. Further, a gasket seal 1330 can be operably be disposed between the seal gland 1300 and the RBS 1352. In some implementations, respective sections 1306, 1302a, 1302b, 1304 can comprise cutouts 1326 (e.g., fastener receptions 316 and 318 of FIG. 3) that align with each other, such as at opposing sides. In this example, the cutouts 1326 can be configured to allow a fastener to pass through to secure the seal gland 1300 (e.g., and the gasket seal 1330) to the pump housing. That is, for example, the assembled seal gland 1300 can be operably secured to the pump housing and/or the RBS by passing one or more fasteners through the respective cutouts 1326, as illustrated in FIGS. 1 and 6.

Figure 14B:
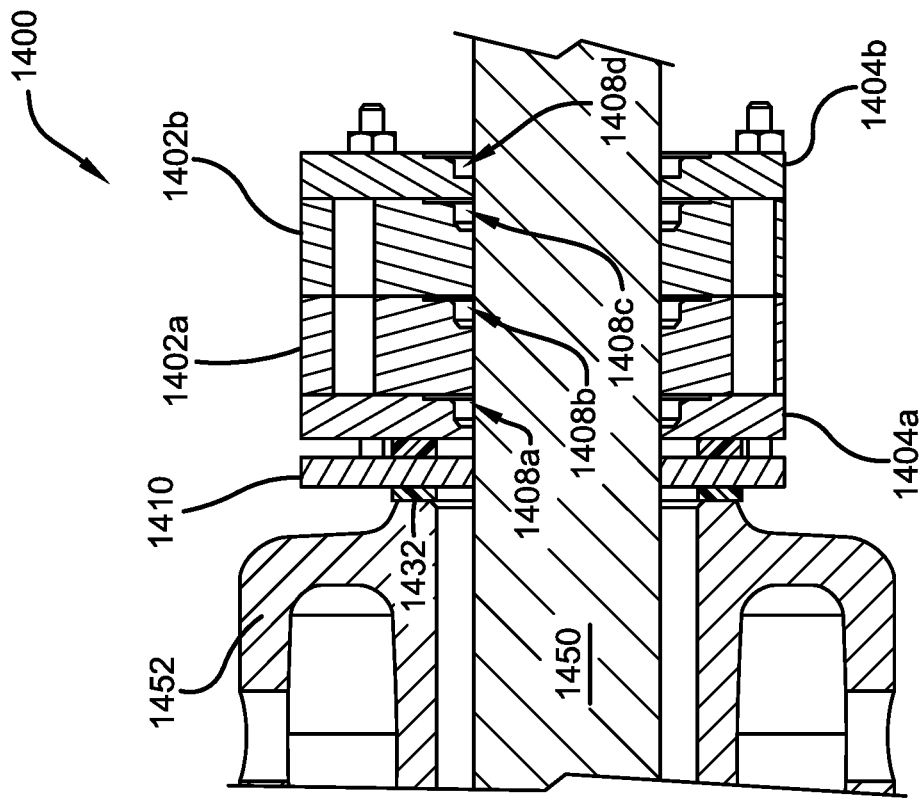
FIGS. 14A and 14B are component diagrams that illustrate a cut-away view of yet another example implementation of a seal gland installed on a pump shaft.
Figure 14A:
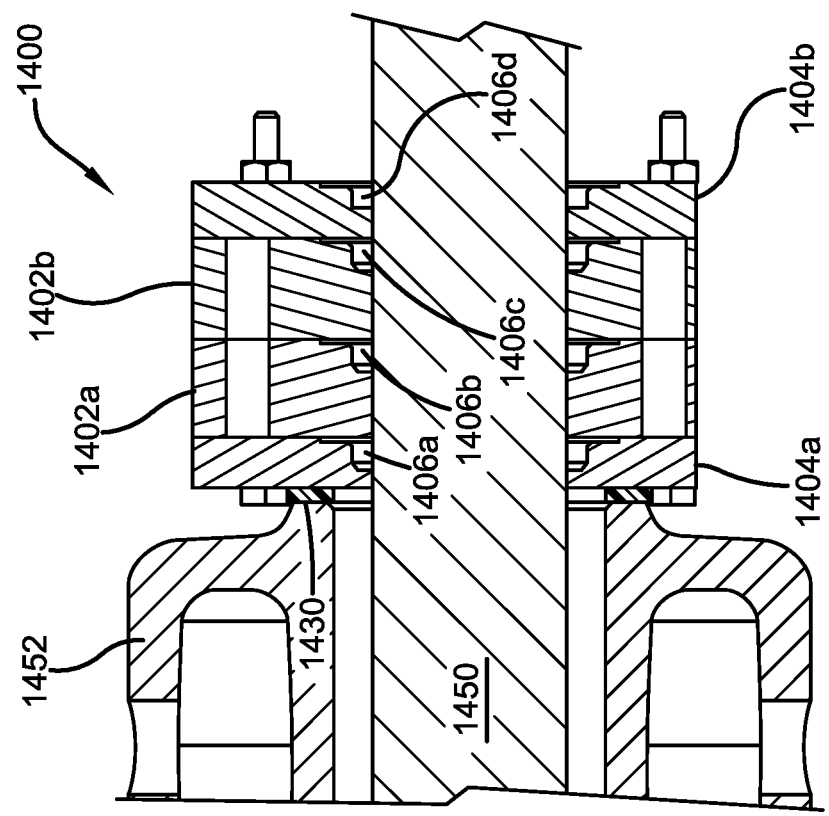

FIGS. 14A and 14B are component diagrams that illustrate another example implementation of a seal gland 1400, shown in cut-away view installed on a pump shaft 1450. In this example implementation, the seal gland 1400 comprises one or more mid-gland sections 1402a, 1402b (e.g., first modular section, second modular section), and two end-gland sections 1404a, 1404b (e.g., third modular section, fourth modular section). Further, as with the prior implementations, respective sections can comprise a channel 1408a, 1408b, 1408c, 1408d and a seal element 1406a, 1046b, 1406c, 1406d to mitigate leakage of fluid along the shaft 1450. In some implementations, channel 1408d may not have seal element 1406d disposed therein during operation.

In this implementation, in FIG. 14A, the gland 1400 is disposed in a first position with the end gland-section 1404a disposed proximate the RBS 1452 (e.g., or the pump housing), with a first seal gasket 1430 disposed therebetween. In this way, the respective seal elements 1406a, 1406b, 1406c (e.g., sometimes 1406d) are also disposed in a first position. Additionally, as illustrated in FIG. 14B, a spacer 1410 can be operably disposed between the end gland-section 1404a and the RBS 1452 (e.g., or the pump housing), with a second seal gasket 1432 disposed therebetween. In this way, in this implementation, the gland 1400 can be disposed in a second position on the shaft 1450, and the respective seal elements 1406a, 1406b, 1406c (e.g., sometimes 1406d) are also disposed in a second position on the shaft 1450. As an example, this can allow for an extended use life for the shaft 1450, where the first position and second position comprise different (e.g., new) wear points for the seal elements 1406a, 1406b, 1406c (e.g., sometimes 1406d).

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A rotating shaft pump seal gland assembly that operably engages a rotating shaft of a pump to mitigate leakage of process fluid along the shaft, comprising:
    a first modular section comprising a first body, the first body comprising a proximal face that operably faces a motor end of a rotating pump shaft onto which it is installed, and a distal face that operably faces a pump end of the pump shaft to define a first orientation, the first body further comprising a first inner wall defining a first bore sized to operably receive the pump shaft, wherein the proximal face comprises a first seal channel disposed at the inner wall, the first seal channel sized and shaped to position a first seal element radially inward of the first modular section and to operably hold the first seal element against the rotating pump shaft; and
    a second modular section comprising a second body, the second body comprising a proximal face and distal face, the second body further comprising a second inner wall defining a second bore sized to operably receive the pump shaft, wherein the distal face of the second modular section is operably engaged with the proximal face of the first modular section to couple the first bore with the second bore, and to compress the first seal element to operably provide a seal between the inside of the first bore and the second bore along the rotating shaft, the operably engaged first and second modular sections being reversible to define a second orientation.

2. The assembly of claim 1, the first seal element comprising a lip seal having a first seal face disposed between the first body and the second body, and a second seal face operably disposed between the first body and the rotating shaft.

3. The assembly of claim 1, the proximal face of the second body comprising a second seal channel disposed at the second inner wall, the second seal channel sized and shaped to operably hold a second seal element against the rotating pump shaft.

4. The assembly of claim 3, comprising a third modular section disposed at the proximal end of the second modular section, the third modular section comprising a third inner wall defining a third bore sized to operably receive the pump shaft, wherein a distal face of the third modular section is operably engaged with the proximal face of the second modular section to compress the second seal element to operably provide a seal between the inside of the second bore and third bore along the rotating shaft.

5. The assembly of claim 4, wherein a width of the third modular section is less than a width of the first modular section and a width of the second modular section.

6. The assembly of claim 4, the third modular section comprising a third seal channel disposed at the third inner wall, the third seal channel sized and shaped to operably hold a third seal element against the rotating pump shaft.

7. The assembly of claim 4, comprising a fourth modular section disposed at the distal end of the first modular section, the fourth modular section comprising a fourth inner wall defining a fourth bore sized to operably receive the pump shaft, and a fourth seal channel disposed at the inner wall to operably hold a fourth seal element, wherein a proximal face of the fourth modular section is operably engaged with the distal face of the first modular section to compress the fourth seal element to operably provide a seal between the inside of the fourth bore and first bore along the rotating shaft.

8. The assembly of claim 1, comprising a third modular section disposed at the distal end of the first modular section, the third modular section comprising a third inner wall defining a third bore sized to operably receive the pump shaft, and a third seal channel disposed at the inner wall to operably hold a third seal element, wherein a proximal face of the third modular section is operably engaged with the distal face of the first modular section to compress the third seal element to operably provide a seal between the inside of the third bore and first bore along the rotating shaft, and wherein a width of the third modular section is less than a width of the first modular section and a width of the second modular section.

9. The assembly of claim 1, the first body comprising a first inlet port fluidly coupled with the first inner wall, and comprising a separate first outlet port fluidly coupled with the first inner wall.

10. The assembly of claim 9, the first body comprising a first lubrication channel disposed around at least a portion of the first inner wall, the first lubrication channel fluidly coupled with the first inlet port and the first outlet port.

11. The assembly of claim 10, the second body comprising a second lubrication channel disposed around at least a portion of the second inner wall, the second lubrication channel fluidly coupled with a second inlet port and a second outlet port disposed in the second body.

12. The assembly of claim 9, comprising a third modular section disposed at the distal end of the first modular section, the third modular section comprising a third inner wall defining a third bore sized to operably receive the pump shaft, and a third seal channel disposed at the inner wall to operably hold a third seal element, wherein a proximal face of the third modular section is operably engaged with the distal face of the first modular section to compress the third seal element to operably provide a seal between the inside of the third bore and first bore along the rotating shaft, and wherein a width of the third modular section is less than a width of the first modular section, and wherein a width of the second modular section is less than a width of the first modular section.

13. The assembly of claim 1, comprising a spacer section that has a width that is less than a width of the first modular section, the spacer disposed at the distal end of the first modular section, and comprising a seal gasket disposed between the spacer and the first modular section, and a seal gasket operably disposed at the distal side of the spacer.

14. The assembly of claim 1, comprising a seal gasket operably disposed at the distal side of the assembly.

15. The assembly of claim 1, comprising one or more fasteners that operably fasten the respective sections together in a fixed engagement.

16. A rotating shaft pump seal gland, comprising:
a first modular section of casing, a second modular section of casing, and a third modular section of casing, together forming a body of the seal gland;
wherein the first modular section is disposed distally from the second modular section and operably engaged together in a fixed engagement;
wherein the third modular section is selectably interchangeable between a distal engagement with the first modular section and a proximal engagement with the second modular section;
wherein the sections of the body of the seal gland are operably fixed together using one or more fasteners;
wherein the body of the seal gland is reversible;
wherein the respective sections of the body comprise a seal channel disposed at an intersection of a proximal face of the section and an inner wall of the section, wherein the inner wall defines a bore sized to operably receive the rotating shaft of the pump; and
wherein a first seal element is disposed in the seal channel of the first modular section and a second seal element is either:
  disposed in the seal channel of the third modular section when the third modular section is disposed distally from the first modular section, or
  disposed in the seal channel of the second modular section when the third modular section is disposed proximally from the second modular section.

17. The seal gland of claim 16, comprising a fourth modular section of casing that, together with the first, second and third modular sections, operably form the body of the seal gland, the fourth modular section also comprising a seal channel disposed at the intersection of the proximal face of the section and the inner wall of the section that is configured to operably hold a third seal element against the rotating shaft.

18. The seal gland of claim 17, the fourth modular section comprising a width that is less than a width of the first modular section and less than the second modular section, the fourth modular section disposed at the proximal end of the body, and the third modular section disposed at the distal end of the body.

19. The seal gland of claim 16, wherein a seal gasket is operably disposed distally from the body of the seal gland on the rotating shaft.

20. A seal gland for a rotating shaft pump, comprising:
a body comprising a proximal end operably disposed toward a motor of a pump, and a distal end operably disposed toward a pump housing of a pump, and comprising:
  a first modular section of casing comprising a first seal channel disposed at an intersection of a proximal face of the first modular section and an inner wall of the section, wherein the inner wall defines a bore sized to operably receive the rotating shaft of the pump, and wherein a first seal element is operably seated in the first seal channel and compressed against the rotating shaft;
  a second modular section of casing disposed proximally from, and engaged with, the first modular section, and comprising a second seal channel disposed at the intersection of the proximal face of the second modular section and the inner wall of the second modular section; and
  a third modular section of casing that is selectably interchangeable between a distal engagement with the first modular section and a proximal engagement with the second modular section, and comprising a third seal channel disposed at the intersection of the proximal face of the third modular section and the inner wall of the third modular section, wherein a second seal element is disposed in the third seal channel when the third modular section is disposed distally from the first modular section, or the second seal element is disposed in the second seal channel when the third modular section is disposed proximally from the second modular section, and wherein a width of the third modular section is less than a width of the first modular channel and a width of the second modular channel; and
one or more fasteners that operably hold the respective modular sections together to form the body;
wherein the body is reversible;
wherein the first modular section and the second modular section respectively comprise an inlet port and outlet port that are fluidly coupled with the inner wall of the section; and
wherein a seal gasket is operably disposed distally from the body of the seal gland on the rotating shaft.

* * * * *